(12) United States Patent
Murata

(10) Patent No.: US 10,589,575 B2
(45) Date of Patent: Mar. 17, 2020

(54) TIRE

(71) Applicant: Sumitomo Rubber Industries, Ltd., Kobe-shi, Hyogo (JP)

(72) Inventor: Takehiko Murata, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 221 days.

(21) Appl. No.: 15/644,167

(22) Filed: Jul. 7, 2017

(65) Prior Publication Data
US 2018/0022165 A1   Jan. 25, 2018

(30) Foreign Application Priority Data

Jul. 25, 2016 (JP) .................. 2016-145501

(51) Int. Cl.
*B60C 11/03* (2006.01)

(52) U.S. Cl.
CPC ...... *B60C 11/0306* (2013.01); *B60C 11/0304* (2013.01); *B60C 2011/0358* (2013.01);
(Continued)

(58) Field of Classification Search
CPC . B60C 11/03; B60C 11/0304; B60C 11/0311; B60C 11/0339; B60C 2011/0358; B60C 2011/0339
(Continued)

(56) References Cited

U.S. PATENT DOCUMENTS 7,077,181 B2 * 7/2006 Hirai ................... B60C 11/0318
152/209.18
9,004,125 B2 * 4/2015 Hirose ................... B60C 11/12
152/209.18
(Continued)

FOREIGN PATENT DOCUMENTS

EP   2769855 A2   8/2014
EP   2907677 A2   8/2015
(Continued)

OTHER PUBLICATIONS

English Translation of JP 2013-049325 A, (Hiroaki) (Year: 2013).*
(Continued)

*Primary Examiner* — Leith S Shafi
*Assistant Examiner* — Edgaredmanuel Troche
(74) *Attorney, Agent, or Firm* — Birch, Stewart, Kolasch & Birch, LLP

(57) ABSTRACT

A tire 1 comprises a tread portion 2, a tread edge Te provided in the tread portion 2, a shoulder main groove 3 extending continuously in the tire circumferential direction in the tread portion 2, and a shoulder land region 5 being defined between the tread edge Te and the shoulder main groove 3. The shoulder land region 5 is provided with a shoulder lateral groove 10 connecting between the shoulder main groove 3 and the tread edge Te and a first shoulder lug groove 11 extending axially inwardly from the tread edge Te and terminating within the shoulder land region 5. An angle θ1 of the shoulder lateral groove 10 with respect to the tire axial direction is larger by 10 to 40 degrees than an angle θ2 of the first shoulder lug groove 11 with respect to the tire axial direction.

20 Claims, 4 Drawing Sheets

(52) U.S. Cl.
CPC ............... *B60C 2011/0365* (2013.01); *B60C 2011/0372* (2013.01); *B60C 2011/0381* (2013.01); *B60C 2200/14* (2013.01)

(58) Field of Classification Search
USPC ............................. 152/209.1, 209.3, 209.8
See application file for complete search history.

(56) References Cited

U.S. PATENT DOCUMENTS

| | | | | |
|---|---|---|---|---|
| 2014/0230982 | A1* | 8/2014 | Ninomiya | B60C 11/0306 152/209.22 |
| 2014/0238567 | A1* | 8/2014 | Iwasaki | B60C 11/0306 152/209.18 |

FOREIGN PATENT DOCUMENTS

| | | | |
|---|---|---|---|
| JP | 11028911 A | * | 2/1999 |
| JP | 2013-49325 A | | 3/2013 |
| JP | 2013049325 A | * | 3/2013 |
| JP | 2014-162259 A | | 9/2014 |

OTHER PUBLICATIONS

English Translation of JP-11028911-A (Moriya) (Year: 1999).*
Extended European Search Report issued in European Application No. 17176526.6 dated Nov. 24, 2017.

* cited by examiner

TIRE

TECHNICAL FIELD

The present invention relates to a tire having improved mud performance while maintaining noise performance.

BACKGROUND ART

Conventionally, it has been known to provide an off-the-road tire with shoulder lateral grooves connecting between a shoulder main groove and one of tread edges, for example, in order to improve running performance on muddy roads (hereinafter, such performance may be referred to as "mud performance"). In such a tire, the shoulder lateral grooves generate a large shearing force against mud and the mud in the shoulder lateral grooves can be discharged from the one of the tread edges, therefore, a large driving force (traction) is exerted on muddy roads.

By the way, as shown in FIG. 4, a muddy road (a) is formed mainly by a mud layer (b) and a hard soil layer (c) arranged under the mud layer (b), and a surface portion (c1) of the soil layer (c) covered with the mud layer (b) shows a low gripping condition due to high water content. When escaping from the muddy road (a), large grip force is required against the surface portion (c1) of the soil layer, but the conventional tire (t) has not been configured in consideration of exerting such grip force.

Further, if groove volume of the shoulder lateral grooves is increased in order to increase the driving force, vibration of air generated in the shoulder main groove is likely to be discharged from the one of the tread edges, therefore, it is possible that noise performance tends to deteriorate.

SUMMARY OF THE INVENTION

The present invention was made in view of the above, and a primary object thereof is to provide a tire capable of improving the noise performance and the mud performance in a good balance.

In one aspect of the present invention, a tire comprises a tread portion, a tread edge provided in the tread portion, a shoulder main groove extending continuously in the tire circumferential direction in the tread portion, and a shoulder land region being defined between the tread edge and the shoulder main groove, wherein the shoulder land region is provided with a shoulder lateral groove connecting between the shoulder main groove and the tread edge and a first shoulder lug groove extending axially inwardly from the tread edge and terminating within the shoulder land region, and an angle of the shoulder lateral groove with respect to the tire axial direction is larger by 10 to 40 degrees than an angle of the first shoulder lug groove with respect to the tire axial direction.

In another aspect of the invention, it is preferred that the groove width of the first shoulder lug groove is 2% to 4% of a tread width.

In another aspect of the invention, it is preferred that the groove width of the first shoulder lug groove gradually increases toward the tread edge.

In another aspect of the invention, it is preferred that the groove width of the first shoulder lug groove at an outer end thereof in the tire axial direction is not greater than 1.2 times the groove width of the first shoulder lug groove at an inner end thereof in the tire axial direction.

In another aspect of the invention, it is preferred that the shoulder land region is provided with a second shoulder lug groove extending axially outwardly from the shoulder main groove and terminating within the shoulder land region and a third shoulder lug groove extending axially inwardly from the tread edge, terminating within the shoulder land region, and having a smaller length in the tire axial direction than the first shoulder lug groove, and a groove width of the second shoulder lug groove is substantially the same as a groove width of the third shoulder lug groove.

DESCRIPTION OF THE PREFERRED EMBODIMENTS

An embodiment of the present invention will now be described in conjunction with accompanying drawings.

Figure 1:
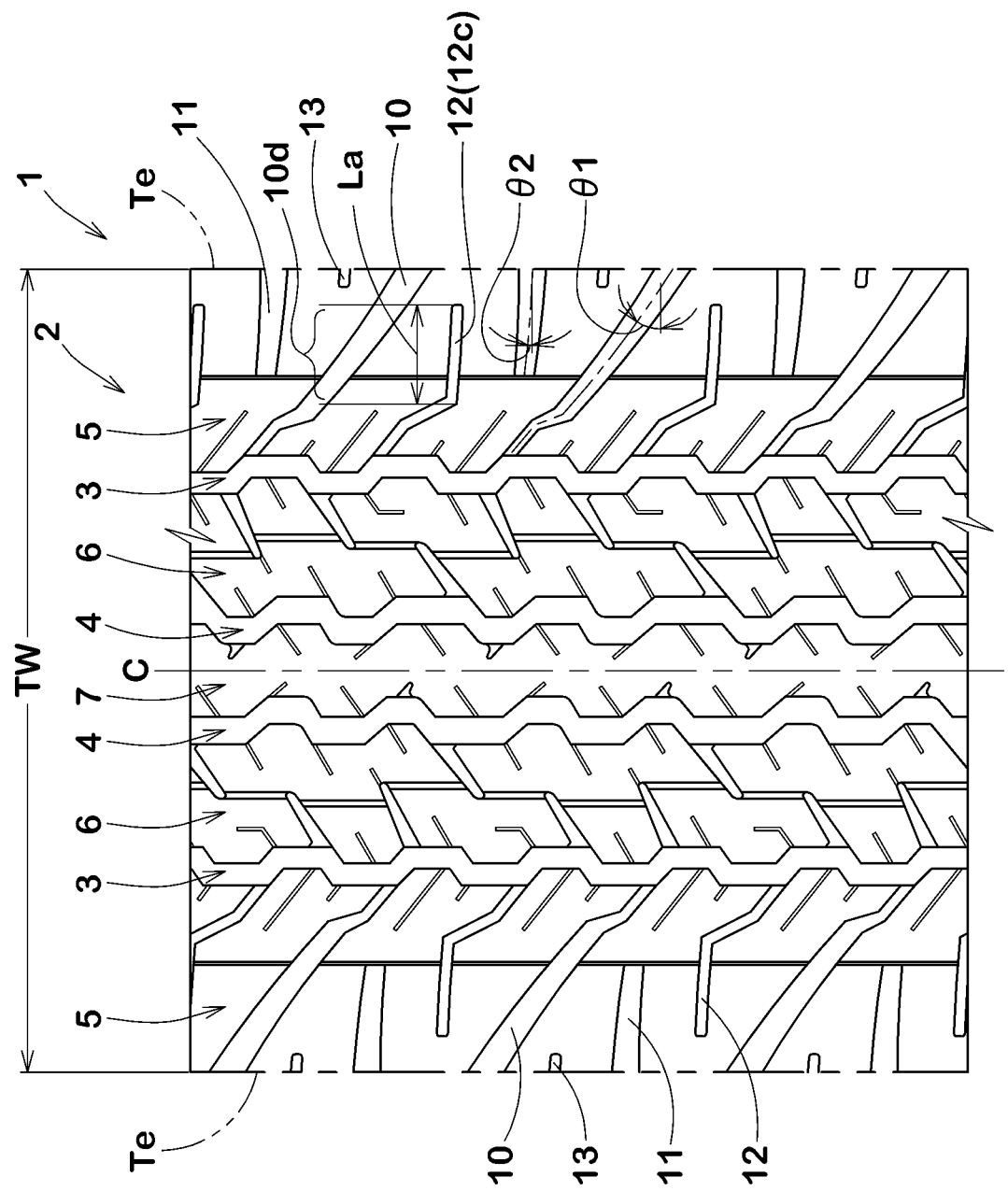
FIG. 1 is a development view of the tread portion of the tire as an embodiment of the present invention.

FIG. 1 is a development view of a tread portion 2 of a tire 1 as an embodiment of the present invention. The present invention can be embodied as various tires such as pneumatic tires for passenger cars and for heavy duty, and non-pneumatic tires which are not filled with air, for example. The tire 1 in this embodiment is a pneumatic tire for passenger cars capable of off-the-road running.

As shown in FIG. 1, the tread portion 2 is provided with at least one shoulder main groove 3 extending continuously in the tire circumferential direction and at least one crown main groove 4 extending continuously in the tire circumferential direction on axially inside of the at least one shoulder main groove 3. The tread portion 2 in this embodiment is provided with a pair of the shoulder main grooves 3 and a pair of the crown main grooves 4.

Figure 2:
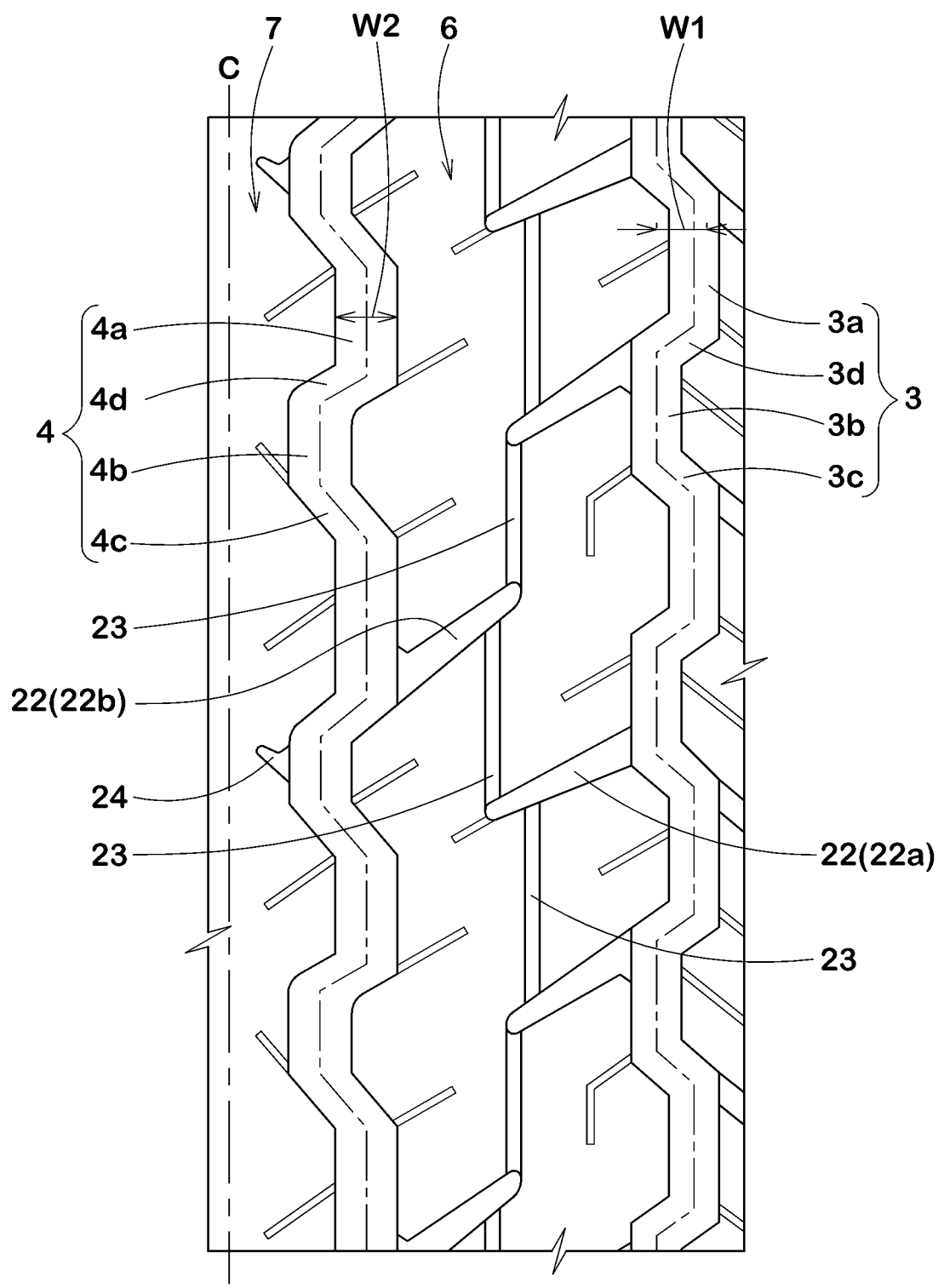
FIG. 2 is an enlarged view of the shoulder main groove and a crown main groove shown in FIG. 1.

As shown in FIG. 2, at least one, preferably each, of the shoulder main grooves 3 in this embodiment is formed as a trapezoidal wave-like zigzag groove including outer groove portions 3a, inner groove portions 3b, first connecting portions 3c, and second connecting portions 3d. The outer groove portions 3a extend straight in the tire circumferential direction. The inner groove portions 3b extend straight in the tire circumferential direction on the axially inside of the outer groove portions 3a. Each of the first connecting portions 3c extends between one of the outer groove portions 3a and one of the inner groove portions 3b so as to be inclined to one side (to the lower right side in FIG. 2) with respect to the tire axial direction. Each of the second connecting portions 3d extends in an opposite direction to the first connecting portions 3c between one of the outer groove portions 3a and one of the inner groove portions 3b. The first connecting portions 3c and the second connecting portions 3d configured as such have tire axial direction components, therefore, it is possible to obtain a large shearing force against mud compressed in the groove.

It is preferred that a groove width W1 of at least one, preferably each, of the shoulder main grooves 3 is 1.0% to 6.0% of a tread width TW (shown in FIG. 1). If the groove width W1 of the at least one of the shoulder main grooves 3 is larger than 6.0% of the tread width TW, groove volume of the at least one of the shoulder main grooves 3 increases and it is possible that the noise performance deteriorates. If the groove width W1 of the at least one of the shoulder main grooves 3 is less than 1.0% of the tread width TW, a soil discharging performance is decreased and it is possible that the mud performance is deteriorated. Further, it is preferred that a groove depth (not shown in the figures) of at least one, preferably each, of the shoulder main grooves 3 is 6.0 to 10.0 mm, for example, in order to effectively exert the above described effects.

Furthermore, the crown main grooves 4 are similar to the shoulder main grooves 3, and at least one, preferably each, of the crown main grooves 4 is formed as a trapezoidal wave-like zigzag groove including outer groove portions 4a, inner groove portions 4b, first connecting portions 4c, and second connecting portions 4d. It is preferred that a groove width W2 of the at least one of the crown main grooves 4 is 1.0% to 6.0% of the tread width TW. It is preferred that a groove depth (not shown in the figures) of at least one, preferably each, of the crown main grooves 4 is 6.0 to 10.0 mm.

The "tread width" TW is defined as a distance in the tire axial direction between axially outermost ground contacting positions of the tire 1 when the tire 1 in a standard state mounted on a standard rim and inflated to a standard pressure with no tire load. The axially outermost ground contacting positions are defined as those of the tire 1 in the standard state when it is in contact with a flat surface with zero camber angle by being loaded with a standard tire load. The "ground contacting positions" are defined as tread edges Te. Sizes and the like of various parts of the tire are those measured in the standard state unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO. Further, the "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

As shown in FIG. 1, the tread portion 2 in this embodiment is provided with a pair of shoulder land regions 5, a pair of middle land regions 6, and a crown land region 7. The shoulder land regions 5 are each defined between one of the shoulder main grooves 3 and its adjacent one of the tread edges Te. The middle land regions 6 are each defined between one of the shoulder main grooves 3 and its adjacent one of the crown main grooves 4. The crown land region 7 is defined between the pair of the crown main grooves 4.

Figure 3:
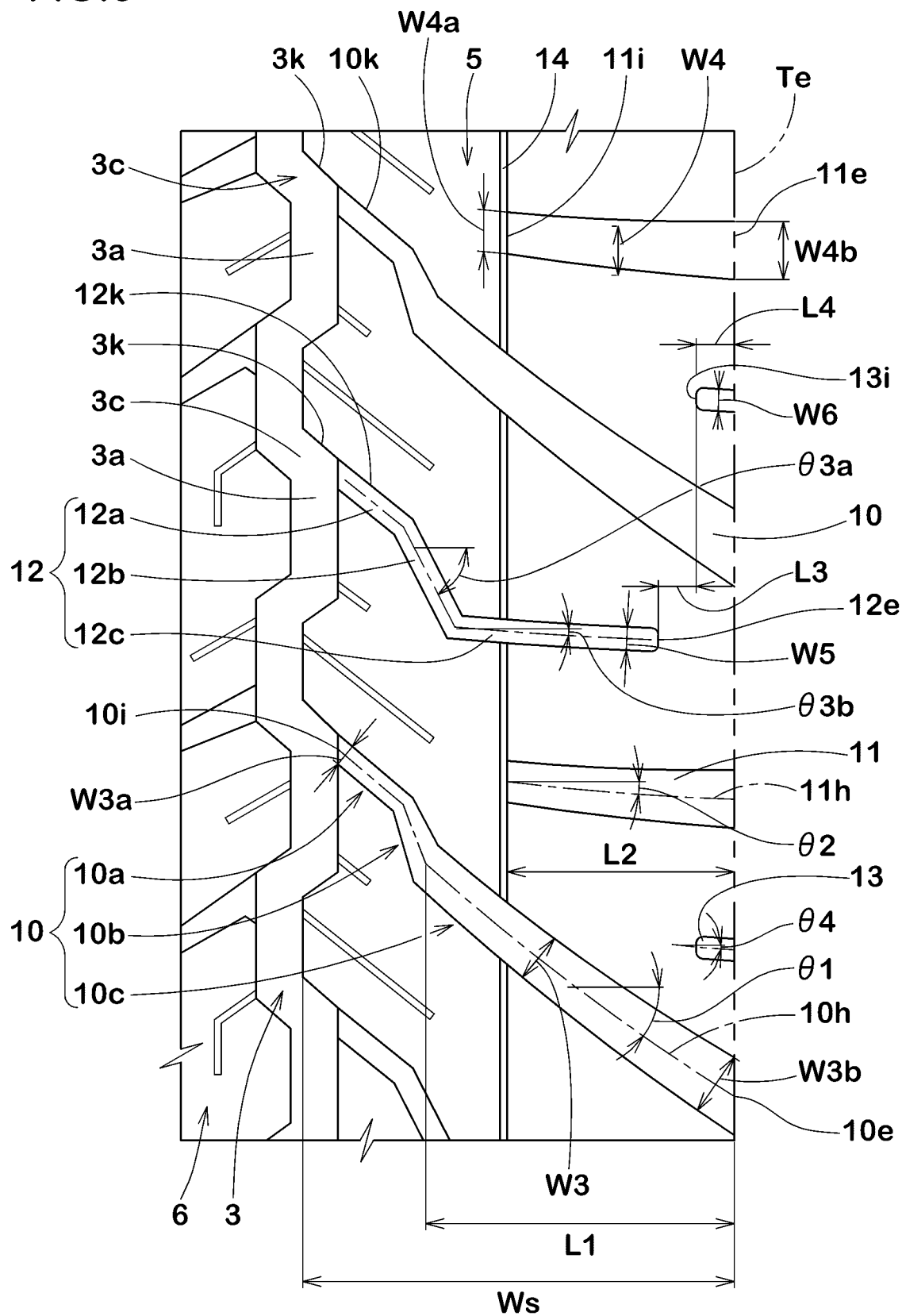
FIG. 3 is an enlarged view of the shoulder land region shown in FIG. 1.
Figure 4:
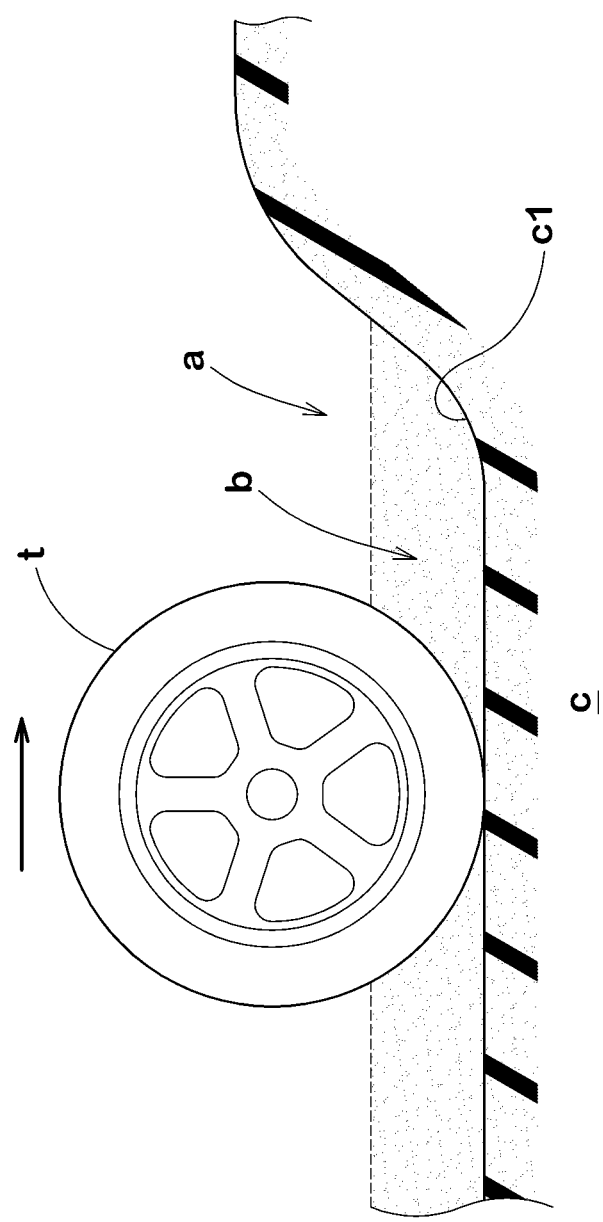
FIG. 4 is a cross-sectional view illustrating the muddy road.

As shown in FIG. 3, at least one, preferably each, of the shoulder land regions 5 is provided with at least one shoulder lateral groove 10, preferably a plurality of them, connecting between one of the shoulder main grooves 3 and its adjacent one of the tread edges Te, and at least one first shoulder lug groove 11, preferably a plurality of them, extending axially inwardly from one of the tread edges Te and terminating within its adjacent one of the shoulder land regions 5. The at least one shoulder lateral groove 10 and the at least one first shoulder lug groove 11 configured as such secure the shearing force against mud and the soil discharging performance, therefore, it is possible that the mud performance is improved. Further, the at least one first shoulder lug groove 11 terminates within the adjacent one of the shoulder land regions 5, therefore, the vibration of the air is not transmitted from the one of the shoulder main grooves 3, for example, and thus the noise performance is maintained high.

An angle $\theta 1$ of the at least one shoulder lateral groove 10 with respect to the tire axial direction is larger by 10 to 40 degrees than an angle $\theta 2$ of the at least one first shoulder lug groove 11 with respect to the tire axial direction. That is, the angle $\theta 1$ of the at least one shoulder lateral groove 10 is set to be larger by 10 to 40 degrees than the angle $\theta 2$ of the at least one first shoulder lug groove 11 having a smaller length in the tire axial direction than the at least one shoulder lateral groove 10. Thereby, it is possible that the at least one shoulder lateral groove 10 effectively drains a lot of mud by using rolling of the tire 1. Further, the at least one shoulder lateral groove 10 gradually contacts a road surface. Thereby, shock (i.e. vibration of the land regions) generated when the shoulder land regions 5 hit the road surface can be reduced, therefore, it is possible that the noise performance can be maintained. Further, the at least one first shoulder lug groove 11 exerts edge effects and generates large grip force by scratching the surface portion of the soil layer containing a lot of water, therefore, escape from muddy roads is made easy.

In order to effectively exert the above-described effects, it is preferred that the angle $\theta 1$ of the at least one shoulder lateral groove 10 is set in a range of 20 to 40 degrees. If the angle $\theta 1$ of the at least one shoulder lateral groove 10 is less than 20 degrees, it is possible that the mud in the groove is not discharged effectively. If the angle $\theta 1$ of the at least one shoulder lateral groove 10 is larger than 40 degrees, it is possible that the shearing force against the mud is decreased. The angle $\theta 1$ of the at least one shoulder lateral groove 10 is defined as the average angle of a groove center line $10h$ of the at least one shoulder lateral groove 10.

It is preferred that the angle $\theta 2$ of the at least one first shoulder lug groove 11 with respect to the tire axial direction is set in a range of 0 to 20 degrees. If the angle $\theta 2$ of the at least one first shoulder lug groove 11 is larger than 20 degrees, the edge effects are not exerted and it is possible that a grip on a surface portion of the mud layer is small. The angle $\theta 2$ of the at least one first shoulder lug groove 11 is defined as the average angle of a groove center line $11h$ of the at least one first shoulder lug groove 11.

The at least one shoulder lateral groove 10 in this embodiment is formed as a crank-shaped bent groove including a first inner lateral groove portion 10a, a first middle lateral groove portion 10b, and a first outer lateral groove portion 10c. The at least one shoulder lateral groove 10 configured as such disturbs the vibration of the air passing through the at least one shoulder lateral groove 10 at a bending portion thereof, therefore, the noise performance is maintained high.

Each of the first inner lateral groove portion 10a, the first middle lateral groove portion 10b, and the first outer lateral groove portion 10c in this embodiment is formed as a straight line. A bent groove is formed by the first inner lateral groove portion 10a and the first middle lateral groove portion 10b, and a bent groove is formed by the first middle lateral groove portion 10b and the first outer lateral groove portion 10c.

The first inner lateral groove portion 10a, the first middle lateral groove portion 10b, and the first outer lateral groove portion 10c in this embodiment are inclined to the same direction with respect to the tire axial direction. The at least one shoulder lateral groove 10 configured as such can more effectively reduce the shock (i.e. the vibration of the land regions) generated when the shoulder land regions 5 hit the road surface, therefore, the noise performance can be improved.

The at least one shoulder lateral groove 10 is connected with one of the outer groove portions 3a of the at least one shoulder main groove 3, and one of groove edges (a groove edge 10k) of the at least one shoulder lateral groove 10 is smoothly connected with one of groove edges (a groove edge 3k) of one of the first connecting portions 3c of the at least one shoulder main groove 3. That is, the one of the first connecting portions 3c and the first inner lateral groove portion 10a form a groove-like body, therefore, large shearing force is generated.

The at least one shoulder lateral groove 10 is formed so that a groove width W3 thereof is constant or gradually increases from an inner end 10i thereof in the tire axial direction to an outer end 10e thereof located on the adjacent one of the tread edges Te. Thereby, mud in the at least one shoulder lateral groove 10 is smoothly discharged to the adjacent one of the tread edges Te, therefore, the mud performance is further improved.

In order to improve the mud performance and the noise performance in a good balance, it is preferred that a groove width W3a of the at least one shoulder lateral groove 10 at axially innermost parts thereof is set in a range of 30% to 60% of a groove width W3b of the at least one shoulder lateral groove 10 at axially outermost parts thereof. It is preferred that the average groove width W3 of the at least one shoulder lateral groove 10 is 1% to 5% of the tread width TW.

The at least one first shoulder lug groove 11 in this embodiment extends to form a smooth arc-like shape. Thereby, rigidity of the shoulder land regions 5 in the vicinity of the at least one first shoulder lug groove 11 is maintained high, therefore, a large grip force is exerted on the surface portion of the soil layer. The at least one first shoulder lug groove 11 is not limited to such an arc-like shape, but may be configured as a straight or a bent shape, for example.

The at least one first shoulder lug groove 11 in this embodiment is inclined to the same direction as the at least one shoulder lateral groove 10 with respect to the tire axial direction. Thereby, rigidity decrease of a region formed between the at least one first shoulder lug groove 11 and the at least one shoulder lateral groove 10 of the shoulder land regions 5 is suppressed, therefore, the grip force is further increased.

If a length L2 of the at least one first shoulder lug groove 11 is small, it is possible that the grip force cannot be increased. If the length L2 of the at least one first shoulder lug groove 11 is large, effect of reducing the shearing force due to decrease in the rigidity of the shoulder land regions 5 is greater than effect of improving the grip force due to increase of the groove length of the at least one first shoulder lug groove 11, therefore, it is possible that the mud performance is deteriorated. Further, the grip force at the surface portion of the soil layer is further increased by scratching the surface portion after the mud is removed therefrom by the at least one shoulder lateral groove 10, for example. Thereby, it is preferred that the at least one first shoulder lug groove 11 is arranged in a region overlapping in the tire axial direction when viewed in the tire circumferential direction with the first outer lateral groove portion 10c extending straight. From this point of view, it is preferred that the length L2 of the at least one first shoulder lug groove 11 in the tire axial direction is set in a range of 60% to 90% of a length L1 of the first outer lateral groove portion 10c in the tire axial direction.

The at least one first shoulder lug groove 11 in this embodiment has a groove width W4 gradually increasing from an inner end 11i in the tire axial direction to an outer end 11e located on the one of the tread edges Te. The at least one first shoulder lug groove 11 configured as such has large soil discharging performance. It is preferred that a ratio (W4b/W4a) of a groove width W4a at the inner end 11i of the at least one first shoulder lug groove 11 and a groove width W4b at the outer end 11e of the at least one first shoulder lug groove 11 is not greater than 1.2. It is preferred that the average groove width W4 of the at least one first shoulder lug groove 11 is set in a range of 2% to 4% of the tread width TW.

Further, at least one, preferably each, of the shoulder land regions 5 is provided with at least one second shoulder lug groove 12, preferably a plurality of them, and at least one third shoulder lug groove 13, preferably a plurality of them. The at least one second shoulder lug groove 12 extends axially outwardly from one of the shoulder main grooves 3 and terminates within one of the shoulder land regions 5 adjacent to the one of the shoulder main grooves 3. The at least one third shoulder lug groove 13 extends axially inwardly from one of the tread edges Te and terminates within one of the shoulder land regions 5 adjacent to the one of the tread edges Te. The at least one third shoulder lug groove 13 is configured to have a smaller length in the tire axial direction than the at least one first shoulder lug groove 11.

The at least one second shoulder lug groove 12 in this embodiment is formed as a crank-shaped bent groove including a second inner lateral groove portion 12a, a second middle lateral groove portion 12b, and a second outer lateral groove portion 12c. The at least one second shoulder lug groove 12 configured as such disturbs the vibration of the air passing through the at least one second shoulder lug groove 12 at each bent portion thereof, therefore, the noise performance is maintained high.

The second inner lateral groove portion 12a, the second middle lateral groove portion 12b, and the second outer lateral groove portion 12c in this embodiment are each formed straight. A bent groove is formed by the second inner lateral groove portion 12a and the second middle lateral groove portion 12b, and a bent groove is formed by the second middle lateral groove portion 12b and the second outer lateral groove portion 12c.

The second inner lateral groove portion 12a, the second middle lateral groove portion 12b, and the second outer lateral groove portion 12c in this embodiment are inclined to the same direction with respect to the tire axial direction. The at least one second shoulder lug groove 12 configured as such gradually contacts the road surface. Thereby, it is possible that the shock (i.e. the vibration of the land regions) generated when the shoulder land regions 5 hit the road surface is reduced, therefore, the noise performance is maintained high.

The second inner lateral groove portion 12a is connected to one of the outer groove portions 3a of the one of the shoulder main grooves 3, and one of groove edges (a groove edge 12k) of the second inner lateral groove portion 12a is smoothly connected with the groove edge 3k of one of the first connecting portions 3c of the one of the shoulder main grooves 3. Thereby, the one of the first connecting portions 3c and the second inner lateral groove portion 12a form a groove-like body, therefore, large shearing force can be exerted.

The second middle lateral groove portion 12b is inclined at a larger angle with respect to the tire axial direction than the second inner lateral groove portion 12a and the second outer lateral groove portion 12c. The second middle lateral groove portion 12b configured as such increases the edge effects in the tire circumferential direction, therefore, side-slip, wobble, etc. on a muddy road can be suppressed. It is preferred that an angle θ3a of the second middle lateral groove portion 12b with respect to the tire axial direction is set in a range of 40 to 80 degrees.

The second outer lateral groove portion 12c is inclined at a smaller angle with respect to the tire axial direction than the second inner lateral groove portion 12a and the second middle lateral groove portion 12b. The second outer lateral groove portion 12c configured as such exerts large grip force against the surface portion of the soil layer. It is preferred that an angle θ3b of the second outer lateral groove portion 12c with respect to the tire axial direction is not greater than 20 degrees.

The second outer lateral groove portion 12c overlaps the first outer lateral groove portion 10c in the tire axial direction when viewed in the tire circumferential direction. Thereby, the second outer lateral groove portion 12c can scratch the surface portion of the soil layer after the mud is removed therefrom by the first outer lateral groove portion 10c, for example, therefore, the grip force is increased. From this point of view, it is preferred that an entire length La of the second outer lateral groove portion 12c in the tire axial direction overlaps the first outer lateral groove portion 10c in the tire axial direction when viewed in the tire circumferential direction. In other words, it is preferred that the second outer lateral groove portion 12c in its entirety in the tire axial direction overlaps the first outer lateral groove portion 10c when viewed in the tire circumferential direction. The first outer lateral groove portion 10c in this embodiment has an overlapping portion 10d (shown in FIG. 1) overlapping the second outer lateral groove portion 12c over the entire length La in the tire axial direction when viewed in the tire circumferential direction.

Although it is not particularly limited, it is preferred that a groove width W5 of the at least one second shoulder lug groove 12 is set in a range of 1% to 3% of the tread width TW.

The at least one third shoulder lug groove 13 extends straight. The at least one third shoulder lug groove 13 configured as such also maintains the rigidity of the shoulder land regions 5 high, therefore, large shearing force and grip force are exerted.

It is preferred that an angle θ4 of the at least one third shoulder lug groove 13 with respect to the tire axial direction is not greater than 20 degrees. If the angle θ4 of the at least one third shoulder lug groove 13 is larger than 20 degrees, the edge effects are decreased, therefore, it is possible that the grip force is decreased.

The at least one third shoulder lug groove 13 does not overlap the at least one second shoulder lug groove 12 in the tire axial direction when viewed in the tire circumferential direction. Thereby, the rigidity of the shoulder land regions 5 is maintained high, therefore, decrease of the shearing force and the grip force is suppressed. In order to effectively exert this effect, it is preferred that a distance L3 in the tire axial direction between an inner end 13i of the at least one third shoulder lug groove 13 in the tire axial direction and an outer end 12e of the at least one second shoulder lug groove 12 in the tire axial direction is set in a range of 5% to 15% of a maximum width Ws of one of the shoulder land regions 5. If the above-mentioned distance L3 is larger than 15% of the maximum width Ws, lengths in the tire axial direction of the at least one third shoulder lug groove 13 and the second outer lateral groove portion 12c are decreased, therefore, the edge effects are not exerted, thereby, it is possible that the mud performance is deteriorated.

In order to effectively exert the above-described effects and improve the noise performance and the mud performance in a good balance, it is preferred that a length L4 of the at least one third shoulder lug groove 13 in the tire axial direction is set in a range of 10% to 20% of the length L2 of the at least one first shoulder lug groove 11.

Although it is not particularly limited, a groove width W6 of the at least one third shoulder lug groove 13 is substantially the same as the groove width W5 of the at least one second shoulder lug groove 12. The terms "substantially the same" means the groove width W6 of the at least one third shoulder lug groove 13 is 0.8 to 1.2 times the groove width W5 of the at least one second shoulder lug groove 12.

As described above, the at least one of the shoulder land regions 5 in this embodiment is provided with the at least one first shoulder lug groove 11, the second outer lateral groove portion 12c and the at least one third shoulder lug groove 13 in a region provided with the first outer lateral groove portion 10c of the at least one shoulder lateral groove 10 on a side of the adjacent one of the tread edges Te where mud is easily removed. Each of the grooves 11, 12c, and 13 has small angles with respect to the tire axial direction, therefore, they effectively scratch the surface portion of the soil layer to generate large grip force, thereby, smooth escape from a muddy road is possible. Therefore, the tire 1 in this embodiment exerts excellent mud performance. Further, the first middle lateral groove portion 10b and the second middle lateral groove portion 12b are arranged in an axially inner part of the at least one of the shoulder land regions 5, therefore, the vibration of the air from one of the shoulder main grooves 3 adjacent to the at least one of the shoulder land region 5 is disturbed early, thereby, the noise performance is maintained high.

At least one, preferably each, of the shoulder land regions 5 is provided with at least one longitudinal narrow groove 14 connected with the inner end 11i of the at least one first shoulder lug groove 11 and extending in the tire circumferential direction. The at least one longitudinal narrow groove 14 configured as such exerts the edge effects in the tire circumferential direction, therefore, side slip, etc. on a muddy road is suppressed. The at least one of the shoulder land regions 5 in this embodiment is provided with a plurality of the longitudinal narrow grooves 14 aligned in the tire circumferential direction, and each of the longitudinal narrow grooves 14 is defined between the shoulder lateral grooves 10 adjacent in the tire circumferential direction.

As shown in FIG. 2, at least one, preferably each, of the middle land regions 6 in this embodiment is provided with middle slots 22 extending in the tire axial direction. The middle slots 22 in this embodiment include at least one outer middle slot 22a, preferably a plurality of them, extending axially inwardly from adjacent one of the shoulder main grooves 3 and terminating within the at least one middle land region 6, and at least one inner middle slot 22b, preferably a plurality of them, extending axially outwardly from adjacent one of the crown main grooves 4 and terminating within the at least one middle land region 6.

The at least one outer middle slot 22a and the at least one inner middle slot 22b configured as such can exert the shearing force owing to the mud compressed in the slots while securing the rigidity of the at least one middle land region 6, therefore, it is possible that the mud performance is improved. Each of the at least one outer middle slot 22a and the at least one inner middle slot 22b is formed as a tapered shape with a width decreasing toward a tip thereof for the soil discharging performance.

The at least one middle land region 6 is provided with at least one longitudinal narrow groove 23 connecting between a pair of the middle slots 22 adjacent to each other in the tire circumferential direction. The at least one longitudinal narrow groove 23 configured as such effectively decreases the rigidity of the at least one middle land region 6 and increases groove widths of the middle slots 22, therefore, the shearing force against mud is increased.

The crown land region 7 is provided with at least one center slot 24 extending in the tire axial direction from one of the crown main grooves 4 toward the tire equator C and terminating without reaching the tire equator C. The at least one center slot 24 configured as such improves the mud performance due to the mud compressed in the slot while ensuring the rigidity in the vicinity of the tire equator C to which large ground pressure is applied during straightaway driving.

While detailed description has been made of the tire as an embodiment of the present invention, it is needless to say that the present invention can be embodied in various forms without being limited to the illustrated embodiment.

Working Example (Example)

Tires of size 275/70R16 having the tread pattern shown in FIG. 1 were made by way of test according to the specification listed in Table 1, and then the test tires were each tested for the mud performance and the noise performance. Common specifications and the test methods of the test tires are as follows.

<Shoulder Land Region>

Ratio of the length L1 of the first outer lateral groove portion to the maximum width Ws of the shoulder land region (L1/Ws): 70%

Ratio of the length L4 of the third shoulder lug groove to the length L2 of the first shoulder lug groove (L4/L2): 15%

Inner ends of the second outer lateral groove portions in the tire axial direction are arranged at the same position in all examples.

<Mud Performance>

The test tires were mounted on all wheels of a test car under the following conditions, then the test car was driven on test course covered with mud with the driver being the only member in the car and the running performance including ease of escape from the muddy road while driving was evaluated based on the driver's feeling. The results are indicated by an evaluation point based on reference 1 being 100, wherein larger numerical value is better.

Test car: 4WD car with displacement of 4600 cc

Rim: 18×8.0J

Tire pressure: 230 kPa

<Noise Performance>

The above test car was driven on the straight test course with the engine stopped and the gear in neutral in accordance with ECE Regulation No. 117. A microphone was installed at a position 7.5 m aside from a center line of the test course and 1.2 m high from a surface of the test course, and a maximum noise level db (A) was measured with passing speed of the test car at the position closest to the microphone being set to 60 km/h. The evaluation was based on reciprocal of the maximum noise level, and the results are indicated by an index based on the reference 1 being 100, wherein the smaller the numerical value, the better the noise performance is.

The test results are shown in Table 1.

TABLE 1

| | Ref. 1 | Ex. 1 | Ex. 2 | Ex. 3 | Ref. 2 | Ex. 4 | Ex. 5 | Ex. 6 | Ex. 7 |
|---|---|---|---|---|---|---|---|---|---|
| Angle difference (θ1−θ2) between Shoulder lateral groove and First shoulder lug groove [degree] | 0 | 25 | 10 | 40 | 50 | 20 | 20 | 25 | 25 |
| Angle θ2 of First shoulder lug groove [degree] | 5 | 5 | 5 | 5 | 5 | 20 | 25 | 5 | 5 |
| Ratio of length L2 of First shoulder lug groove to length L1 of First outer lateral groove portion [%] | 75 | 75 | 75 | 75 | 75 | 75 | 75 | 55 | 60 |
| Angle θ3b of Second outer lateral groove portion [degree] | 5 | 5 | 5 | 5 | 5 | 5 | 5 | 5 | 5 |
| Ratio (L3/Ws) of distance L3 between Second outer lateral groove portion and Third shoulder lug groove to maximum width Ws of Shoulder land region [%] | 10 | 10 | 10 | 10 | 10 | 10 | 10 | 10 | 10 |
| Mud performance [evaluation point: larger is better] | 100 | 110 | 107 | 105 | 100 | 106 | 103 | 107 | 108 |
| Noise performance [index: larger is better] | 100 | 105 | 103 | 107 | 107 | 106 | 107 | 105 | 105 |

| | Ex. 8 | Ex. 9 | Ex. 10 | Ex. 11 | Ex. 12 | Ex. 13 | Ex. 14 | Ex. 15 |
|---|---|---|---|---|---|---|---|---|
| Angle difference (θ1−θ2) between Shoulder lateral groove and First shoulder lug groove [degree] | 25 | 25 | 25 | 25 | 25 | 25 | 25 | 25 |
| Angle θ2 of First shoulder lug groove [degree] | 5 | 5 | 5 | 5 | 5 | 5 | 5 | 5 |
| Ratio of length L2 of First shoulder lug | 90 | 95 | 75 | 75 | 75 | 75 | 75 | 75 |

TABLE 1-continued

| | | | | | | | | |
|---|---|---|---|---|---|---|---|---|
| groove to length L1 of First outer lateral groove portion [%] | | | | | | | | |
| Angle θ3b of Second outer lateral groove portion [degree] | 5 | 5 | 20 | 25 | 5 | 5 | 5 | 5 |
| Ratio (L3/Ws) of distance L3 between Second outer lateral groove portion and Third shoulder lug groove to maximum width Ws of Shoulder land region [%] | 10 | 10 | 10 | 10 | 3 | 5 | 15 | 18 |
| Mud performance [evaluation point: larger is better] | 112 | 112 | 108 | 107 | 107 | 109 | 109 | 107 |
| Noise performance [index: larger is better] | 103 | 101 | 105 | 105 | 105 | 105 | 105 | 105 |

From the test results, it can be confirmed that various performance of the tires in the examples in Table 1 was improved in a good balance, compared with the tire in the reference 1 in Table 1. Further, test tires of a different size were tested, and the same results were obtained.

The invention claimed is:

1. A tire comprising a tread portion, a tread edge provided in the tread portion, a shoulder main groove extending continuously in the tire circumferential direction in the tread portion, and a shoulder land region being defined between the tread edge and the shoulder main groove,
wherein,
the shoulder land region is provided with a shoulder lateral groove connecting between the shoulder main groove and the tread edge and a first shoulder lug groove extending axially inwardly from the tread edge and terminating within the shoulder land region,
an angle of the shoulder lateral groove with respect to the tire axial direction is larger by 10 to 40 degrees than an angle of the first shoulder lug groove with respect to the tire axial direction,
the shoulder main groove is formed as a trapezoidal wavy zigzag groove including outer groove portions, inner groove portions, first connecting portions, and second connecting portions,
the outer groove portions extend straight in the tire circumferential direction,
the inner groove portions extend straight in the tire circumferential direction on the axially inside of the outer groove portions,
each of the first connecting portions extends between a respective one of the outer groove portions and one of the inner groove portions adjacent thereto in the tire circumferential direction so as to be inclined to one side with respect to the tire axial direction,
each of the second connecting portions extends between a respective one of the outer groove portions and one of the inner groove portions adjacent thereto in the tire circumferential direction so as to be inclined in an opposite direction to the first connecting portions,
one of groove edges of the shoulder lateral groove is smoothly connected with one of groove edges of one of the first connecting portions of the shoulder main groove,
the shoulder land region is provided with a second shoulder lug groove extending axially outwardly from the shoulder main groove and terminating within the shoulder land region and a third shoulder lug groove extending axially inwardly from the tread edge, terminating within the shoulder land region, and having a smaller length in the tire axial direction than the first shoulder lug groove, and a groove width of the second shoulder lug groove is substantially the same as a groove width of the third shoulder lug groove, and
the second shoulder lug groove is formed as a crank-shaped bent groove including a second inner lateral groove portion, a second middle lateral groove portion, and a second outer lateral groove portion each extending straight and inclined to the same direction with respect to the tire axial direction.

2. The tire according to claim 1, wherein
the groove width of the first shoulder lug groove is 2% to 4% of a tread width.

3. The tire according to claim 1, wherein
the groove width of the first shoulder lug groove gradually increases toward the tread edge.

4. The tire according to claim 3, wherein
the groove width of the first shoulder lug groove at an outer end thereof in the tire axial direction is not greater than 1.2 times the groove width of the first shoulder lug groove at an inner end thereof in the tire axial direction.

5. The tire according to claim 1, wherein the first shoulder lug groove extends to form a smooth arc shape in its entire length.

6. The tire according to claim 1, wherein an angle of the shoulder lateral groove is in a range of from 20 to 40 degrees.

7. The tire according to claim 1, wherein a groove width of the shoulder lateral groove at an axially innermost part thereof is in a range of from 30% to 60% of a groove width of the shoulder lateral groove at an axially outermost part thereof.

8. The tire according to claim 1, wherein an angle of the first shoulder lug groove with respect to the tire axial direction is in a range of from 0 to 20 degrees.

9. The tire according to claim 1, wherein the second inner lateral groove portion is connected to one of the outer groove portions of the shoulder main groove such that one of groove edges of the second inner lateral groove portion is smoothly connected with one of groove edges of one of the first connecting portions of the shoulder main groove adjacent to the outer groove portion to which the second inner lateral groove portion is connected.

10. The tire according to claim 1, wherein the second middle lateral groove portion is inclined at a larger angle with respect to the tire axial direction than the second inner lateral groove portion and the second outer lateral groove portion.

11. The tire according to claim 1, wherein an angle of the second middle lateral groove portion with respect to the tire axial direction is in a range of from 40 to 80 degrees.

12. The tire according to claim 1, wherein the second outer lateral groove portion is inclined at a smaller angle with respect to the tire axial direction than the second inner lateral groove portion and the second middle lateral groove portion.

13. The tire according to claim 1, wherein an angle of the second outer lateral groove portion with respect to the tire axial direction is not greater than 20 degrees.

14. The tire according to claim 1, wherein an angle of the third shoulder lug groove with respect to the tire axial direction is not greater than 20 degrees.

15. The tire according to claim 1, wherein:
the third shoulder lug groove does not overlap the second shoulder lug groove in the tire axial direction when viewed in the tire circumferential direction, and
a distance in the tire axial direction between an inner end in the tire axial direction of the third shoulder lug groove and an outer end in the tire axial direction of the second shoulder lug groove is in a range of from 5% to 15% of a maximum width of the shoulder land region.

16. The tire according to claim 1, wherein the shoulder land region is provided with a longitudinal narrow groove connected with an inner end in the tire axial direction of the first shoulder lug groove and extending in the tire circumferential direction.

17. The tire according to claim 1, wherein:
the tread portion further includes a middle land region arranged on a side opposite to the shoulder land region of the shoulder main groove, and
the middle land region is provided with middle slots extending in the tire axial direction and at least one longitudinal narrow groove connecting between a pair of the middle slots adjacent to each other in the tire circumferential direction.

18. The tire according to claim 1, wherein:
the tread portion further includes a middle land region arranged on a side opposite to the shoulder land region of the shoulder main groove, and
the middle land region is provided with middle slots extending in the tire axial direction,
the middle slots include an outer middle slot extending axially inwardly from the shoulder main groove and terminating within the middle land region, and an inner middle slot extending axially outwardly from an edge of the middle land region on a side opposite to the shoulder main groove and terminating within the middle land region.

19. A tire comprising a tread portion, a tread edge provided in the tread portion, a shoulder main groove extending continuously in the tire circumferential direction in the tread portion, and a shoulder land region being defined between the tread edge and the shoulder main groove,
wherein,
the shoulder land region is provided with a shoulder lateral groove connecting between the shoulder main groove and the tread edge and a first shoulder lug groove extending axially inwardly from the tread edge and terminating within the shoulder land region,
an angle of the shoulder lateral groove with respect to the tire axial direction is larger by 10 to 40 degrees than an angle of the first shoulder lug groove with respect to the tire axial direction,
the shoulder main groove is formed as a trapezoidal wavy zigzag groove including outer groove portions, inner groove portions, first connecting portions, and second connecting portions,
the outer groove portions extend straight in the tire circumferential direction,
the inner groove portions extend straight in the tire circumferential direction on the axially inside of the outer groove portions,
each of the first connecting portions extends between a respective one of the outer groove portions and one of the inner groove portions adjacent thereto in the tire circumferential direction so as to be inclined to one side with respect to the tire axial direction,
each of the second connecting portions extends between a respective one of the outer groove portions and one of the inner groove portions adjacent thereto in the tire circumferential direction so as to be inclined in an opposite direction to the first connecting portions,
one of groove edges of the shoulder lateral groove is smoothly connected with one of groove edges of one of the first connecting portions of the shoulder main groove,
the shoulder land region is provided with a second shoulder lug groove extending axially outwardly from the shoulder main groove and terminating within the shoulder land region and a third shoulder lug groove extending axially inwardly from the tread edge, terminating within the shoulder land region, and having a smaller length in the tire axial direction than the first shoulder lug groove, and
a groove width of the second shoulder lug groove is substantially the same as a groove width of the third shoulder lug groove,
the third shoulder lug groove does not overlap the second shoulder lug groove in the tire axial direction when viewed in the tire circumferential direction, and
a distance in the tire axial direction between an inner end in the tire axial direction of the third shoulder lug groove and an outer end in the tire axial direction of the second shoulder lug groove is in a range of from 5% to 15% of a maximum width of the shoulder land region.

20. The tire according to claim 19, wherein
the groove width of the first shoulder lug groove is 2% to 4% of a tread width.

* * * * *